(No Model.) 9 Sheets—Sheet 1.

J. B. HADAWAY.
INSOLE REINFORCING MACHINE.

No. 603,763. Patented May 10, 1898.

Fig. 1.

Witnesses:
Chas. E. Gaylord.
Harry White.

Inventor:
John B. Hadaway,
By Dyrenforth & Dyrenforth,
Attys.

(No Model.) 9 Sheets—Sheet 3.

J. B. HADAWAY.
INSOLE REINFORCING MACHINE.

No. 603,763. Patented May 10, 1898.

Fig. 3.

Witnesses:
Chas. E. Taylor
Harry White

Inventor:
John B. Hadaway,
By Dyrenforth & Dyrenforth,
Attys.

THE NORRIS PETERS CO., PHOTO-LITHO., WASHINGTON, D. C.

(No Model.) 9 Sheets—Sheet 4.

J. B. HADAWAY.
INSOLE REINFORCING MACHINE.

No. 603,763. Patented May 10, 1898.

Fig. 4.

Witnesses:
Gus. E. Gaylord,
Harry White

Inventor:
John B. Hadaway,
By Dyrenforth & Dyrenforth,
Attys.

(No Model.) 9 Sheets—Sheet 5.

J. B. HADAWAY.
INSOLE REINFORCING MACHINE.

No. 603,763. Patented May 10, 1898.

Witnesses:
Chs. E. Gaylord
Harry White

Inventor
John B. Hadaway,
By Dyrenforth & Dyrenforth,
Att'ys (No Model.) 9 Sheets—Sheet 6.

J. B. HADAWAY.
INSOLE REINFORCING MACHINE.

No. 603,763. Patented May 10, 1898.

Witnesses:
Chas. E. Gaylord
Harry White Inventor:
John B. Hadaway,
By Dyrenforth & Dyrenforth,
Attys.

(No Model.) 9 Sheets—Sheet 7.

J. B. HADAWAY.
INSOLE REINFORCING MACHINE.

No. 603,763. Patented May 10, 1898.

Witnesses:
Inventor:
John B. Hadaway,

(No Model.) 9 Sheets—Sheet 8.

J. B. HADAWAY.
INSOLE REINFORCING MACHINE.

No. 603,763. Patented May 10, 1898.

Witnesses:
Inventor:
John B. Hadaway,
By Dyrenforth & Dyrenforth,
Attys.

(No Model.)

J. B. HADAWAY.
INSOLE REINFORCING MACHINE.

No. 603,763.　　　　　　　　　Patented May 10, 1898.

Witnesses:
Chas. E. Gaylord,
Richard Spencer

Inventor:
John B. Hadaway,
By Dyrenforth & Dyrenforth,
Attys.

UNITED STATES PATENT OFFICE.

JOHN B. HADAWAY, OF BROCKTON, MASSACHUSETTS, ASSIGNOR, BY MESNE ASSIGNMENTS, TO THE GEM FLEXIBLE INSOLE COMPANY, OF MAINE.

INSOLE-REINFORCING MACHINE.

SPECIFICATION forming part of Letters Patent No. 603,763, dated May 10, 1898.

Application filed December 23, 1895. Serial No. 572,972. (No model.)

*To all whom it may concern:*

Be it known that I, JOHN B. HADAWAY, a citizen of the United States, residing at Brockton, in the county of Plymouth and State of Massachusetts, have invented a new and useful Improvement in Insole-Reinforcing Machines, of which the following is a specification.

The present invention relates to boot and shoe machinery, and more particularly to a machine for applying a reinforcing-covering to insoles.

It is desirable in the manufacture of shoes, and more particularly welted shoes, to employ an insole of thin flexible stock instead of the comparatively thick stock which is now commonly used for insoles, both because the thinner stock enables a more flexible shoe to be produced and because it is much cheaper than the thicker stock, and by the use of insoles made of the thin stock a much more flexible and better shoe can be produced for less money than by making the insoles of the thicker and more expensive stock.

While it is desirable to employ thin stock for insoles, it has been found that such insoles are not strong enough in themselves to withstand the great strain which is put upon them by the stitches of the inseam which unite the upper and welt thereto, and therefore it has been proposed to reinforce insoles made of comparatively cheap and thin leather by a layer of canvas or other suitable strong textile material, which is cemented to the under side of the insole, and if such insoles have a lip formed integrally therewith, as they are usually formed, the reinforcing material is indented over the lip or formed with a bead or crimp cemented to the sides of the lip, the free edge of the reinforcing material being extended to the edge of the insole and cemented to the feather. The insole thus formed of thin stock and reinforced as described has been received with much favor by shoe manufacturers generally; but prior to the present invention they have been produced in limited quantities only, for the reason that they have been produced by hand, there being no machine in existence, so far as I am at present advised, which is adapted to form the bead or crimp in the reinforcing material and apply such material to the insole.

The object of the present invention, therefore, is to produce a machine by which a bead or crimp may be formed in the reinforcing material and such material applied to the insole.

A further object of the present invention is to combine with the mechanism which forms the bead or crimp in the reinforcing material and applies it to the insole suitable trimming-knives to trim or cut the reinforcing material to conform the same to the contour of the edge of the insole.

To the above end the present invention consists of mechanism arranged to form a bead or crimp in the reinforcing material and to apply such reinforcing material to an insole.

The present invention further consists of bead-forming mechanism arranged to form a bead or crimp in the reinforcing material and to apply such material to insoles and trimming mechanism arranged to trim the edge of the reinforcing material to conform it to the edge of the insole.

The present invention further consists of the devices and combination of devices which will be hereinafter described, and particularly pointed out in the claims.

One embodiment of the present invention is illustrated in the accompanying drawings, and without in any manner limiting the present invention thereto I will now proceed to describe the construction and mode of operation of such illustrated embodiment.

Similar letters of reference will be employed to designate corresponding parts throughout the several views of the drawings.

In the drawings, A represents the head or frame of suitable size and shape to support the working parts and comprising side portions $q$ and $q'$ rising from a base-plate which is supported upon a suitable base or standard B, the upper portion only of which is shown in the drawings.

The sides $q$ and $q'$ are braced by a cross-brace $q^2$, and at their upper ends are provided with forwardly-extending arms $r$ and $r'$ and rearwardly-extending arms $r^2$ and $r^3$, the arms $r^2$ and $r^3$, carrying suitable bearings in which is mounted the rotary shaft C, which shaft has at one end a suitable fly or hand wheel C' and at its opposite end a suitable driving-pulley $C^2$, which is arranged to be driven by a belt from any suitable source of power to impart a rotary motion to shaft C to thus operate the moving parts of the machine.

Fixedly secured upon shaft C between its bearings, by means of set-screws $s$, is a cam-drum X, which has cam-grooves $D'$ and $D^2$ formed in its opposite ends, and also a peripheral cam-groove $D^3$ upon its circumferential face, which, with a cam-groove D, formed on the inner face of the pulley $C^2$, actuate all the moving parts of the machine.

The machine of the drawings comprises a suitable work-support, which is preferably arranged, as shown, to rotate and have a movement toward and from the bead-forming tools.

E' represents the work-support, which consists of a circular plate having a slightly-rounded upper surface and a cylindrical stem or shank on its under side, which is supported to turn freely in a bearing formed in the forward end of a frame E, whereby said work-support is free to turn as the work is fed. The frame E is bifurcated, as shown, or provided with inwardly-extending arms, which are fulcrumed at $x$ $x$ to the inner faces of the sides $q$ and $q'$ of the frame A.

In order to sustain the work-support E' to hold the work against the action of the insole-reinforcing tools, there is provided a coiled spring $t$, which at one end bears against the under side of the forward end of the frame E and at its lower end is supported by a head $p^2$ of an adjustable threaded sleeve $p'$, which is mounted in a threaded bearing in a bracket or arm $v$, which projects from the front of the base-plate of the frame A. The sleeve $p'$ is provided with a jam-nut $p^3$, which engages the threaded portion of the sleeve beneath the arm $v$ and by means of which it is secured in its adjusted position therein.

Pivotally connected to the under side of the frame E is a rod $p$, which extends through the spring $t$ and through the sleeve $p'$, and at its lower end carries a hook $p^6$, to which is connected a rod or cord $p^7$, which at its other end is connected to a suitable foot-treadle, (not shown,) whereby the operator may depress the work-support E' against the tension of the spring $t$ when inserting or removing the work. The spring $t$ normally sustains the work-support elevated, and in order to adjust the point to which the work-support E' may be moved by the spring $t$ the rod $p$ is preferably threaded at its lower end and provided with an adjustable stop, shown as nuts $p^5$, arranged to engage the head $p^4$ of the sleeve $p'$, and thus limit the upward movement of the work-support E'.

In forming the bead or crimp in the reinforcing material said material is temporarily connected to the under face of the insole at its central or medial section, and by means of a suitable tool (which will be hereinafter called a "presser-tool") the reinforcing material is pressed into the angle formed by the inner face of the lip and surface of the insole (where the insole has a lip) or against the surface of the sole at the end of the former or anvil, (where the insole has no lip,) the former or anvil being projected beneath the free edge of the reinforcing material. The reinforcing material is then acted upon by the beading or crimping tool, which presses it down over the lip of the insole or over the projecting finger of the former or anvil and lays the edge thereof on the feather.

The former or anvil of the machine of the drawings is shown at I', and consists of a plate or body portion $k$, with a forward extension $k^2$, preferably tapered, as shown, and an upturned rounded bead-molding head $k^3$, which in some cases may have the laterally-extending finger $k^4$. (See Fig. 12.) Back of the head $k^3$ is provided a notch or cut-out portion $k^7$, which permits the depression of the upper cutter, to be described. The former or anvil is preferably arranged to project over the edge of the work-support E' in position to project beneath the edge of the reinforcing material upon the insole, and it is preferably provided with a gage $k^5$, which is arranged to engage the edge of the insole and properly position the insole with reference to the beader or crimper, although such gage may not be necessary when operating upon a lipped insole, for the reason that the lip thereon will be received against the end of the former or anvil beneath the bead-molding head $k^3$. The former or anvil is preferably arranged to have a lateral movement from side to side of the machine in order to assist in feeding the work, and for this purpose it is mounted upon the forward end of a lever I, which lever is fulcrumed upon a post $l$, fixed in a boss $l'$ of the frame A by a set-screw or other suitable means, the opposite end of the lever I carrying a cam-roll $n^2$, which engages the path-cam $D^3$ of the cam-drum X. The former or anvil is preferably secured to the lever I in such manner that it may be longitudinally adjustable thereon, and for this purpose it is provided with a slot $k'$, through which passes a bolt, by means of which it is secured to the lever I. By providing a longitudinal adjustment of the anvil or former I' it is adapted for operating upon insoles having feathers or projecting edges of varying widths.

Figure 3:
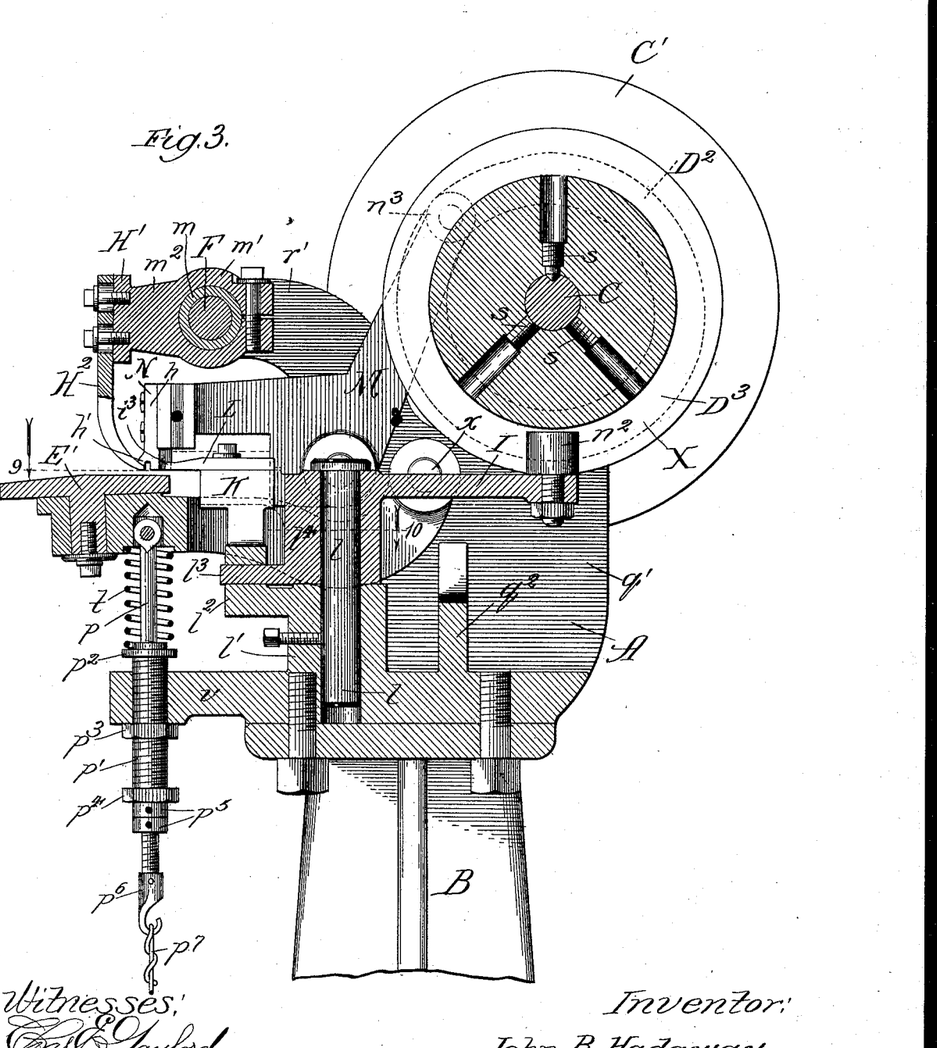
Fig. 3 is a vertical section of the machine, taken on the dotted line 3 of Fig. 4, looking in the direction of the arrow.
Figure 4:
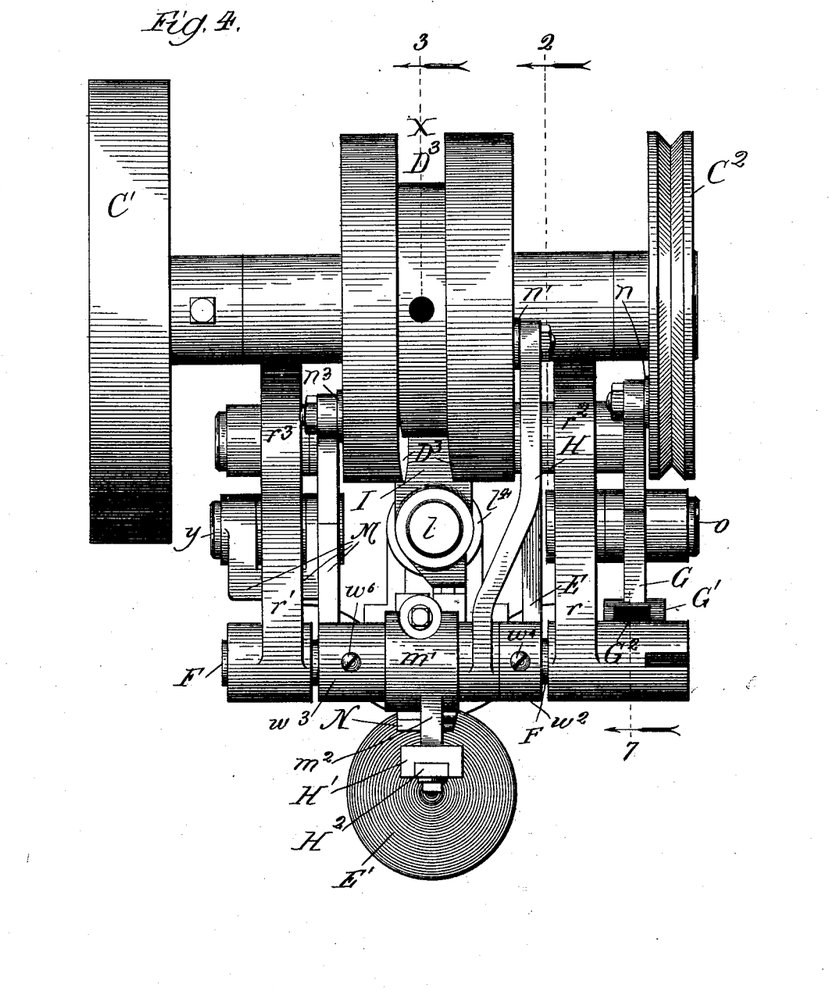
Fig. 4 is a top plan view of the machine.
Figure 5:
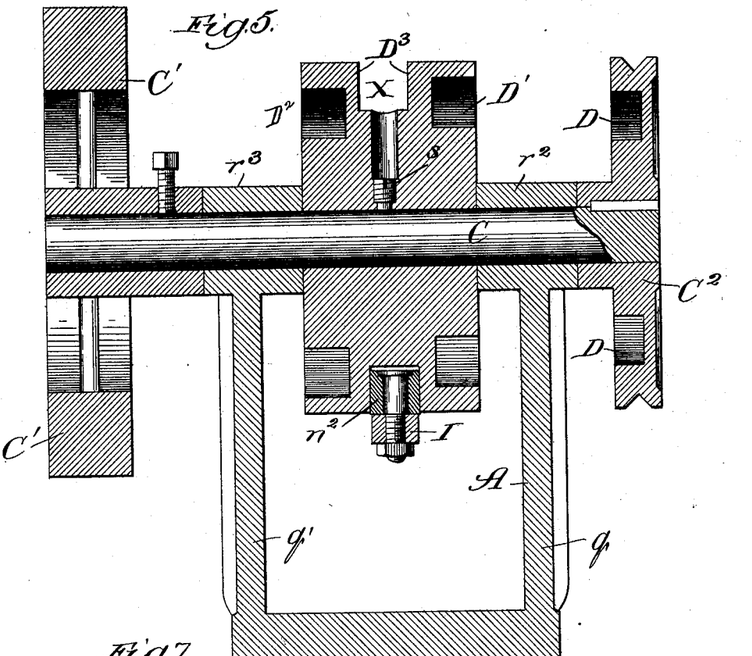
Fig. 5 is a vertical section of the machine, taken on the dotted line 5 in Fig. 1, looking in the direction of the arrow.
Figure 22:
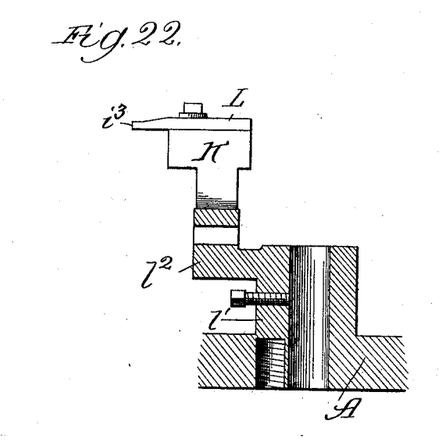
Fig. 22, a partial section taken on dotted line 22 on Fig. 23, looking in the direction of the arrow.
Figure 23:
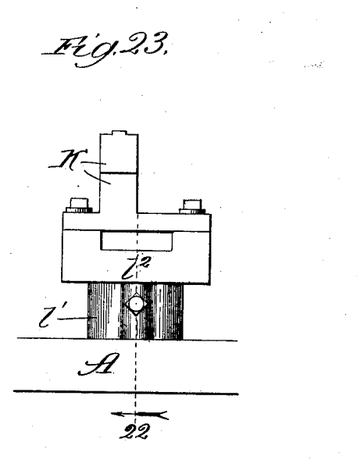
Fig. 23, a front elevation of the part shown in Fig. 22, with the lower cutter removed.

In order to strengthen and steady the lever I in its lateral oscillations and to permit it to withstand the upward thrust of the work, it is provided with an extension $l^3$, which projects from the lower end of the sleeve $l^4$ and engages a guide-slot formed in an arm $l^2$, beneath the stand K, which is bolted to the top of said arm, (see Figs. 3, 22, and 23,) by means of which the former or anvil I' is enabled to withstand the upward thrust of the work against the lower side thereof as it is forced up by the work-support.

The presser-tool is shown at $H^2$, and it consists of a downwardly and inwardly bent finger which is given a movement toward and from the work, (which is on the work-support,) and also preferably has a lateral movement while clamping the work against the outer end of the former or anvil and simultaneously with the lateral movement of said former or anvil for the purpose of imparting a step-by-step feeding movement to the work.

To secure the above result in the machine of the drawings, the presser-tool $H^2$ is adjustably secured by means of slots in its upper end and suitable set-screws (see Fig. 3) to a head H' on the outer end of an arm $m^2$, formed on a pinch-collar $m'$, which by means of a suitable bolt engaging its split ends is clamped to a sleeve $m$ on a lever H, which is mounted to oscillate upon a shaft F, which shaft, for a purpose to be hereinafter described, is mounted to have a slight longitudinal sliding movement in suitable bearings carried by the forwardly-extending arms $r$ and $r'$ of the sides $q$ and $q'$ of the frame A. The sleeve $m$ of the lever H is prevented from moving along the shaft F by means of suitable collars $w^2$ and $w^3$, which are fixed on said shaft upon each side of the sleeve $m$ by means of set-screws $w^4$ and $w^6$. The opposite end of the lever H is provided with a cam-roll $n'$, which engages the cam-path D' in the side of the cam-drum X, whereby a rotation of the cam-drum will, through the lever H, impart an up-and-down movement to the presser-tool $H^2$ toward and from the work, causing the lower end thereof to force the reinforcing material into the angle between the inner face of the lip and the surface of the insole or to press said material against the surface of the insole adjacent to the end of the former or anvil when covering an unlipped insole, as hereinbefore explained.

The pressure of the end of the presser-tool $H^2$ against the work acts to clamp said work against the former or anvil, and while thus clamped the former or anvil is moved laterally and a simultaneous lateral movement is imparted to the presser-tool, whereby the work is fed step by step toward the beading or crimping tool and the cutters.

Figures 6, 7, 8:
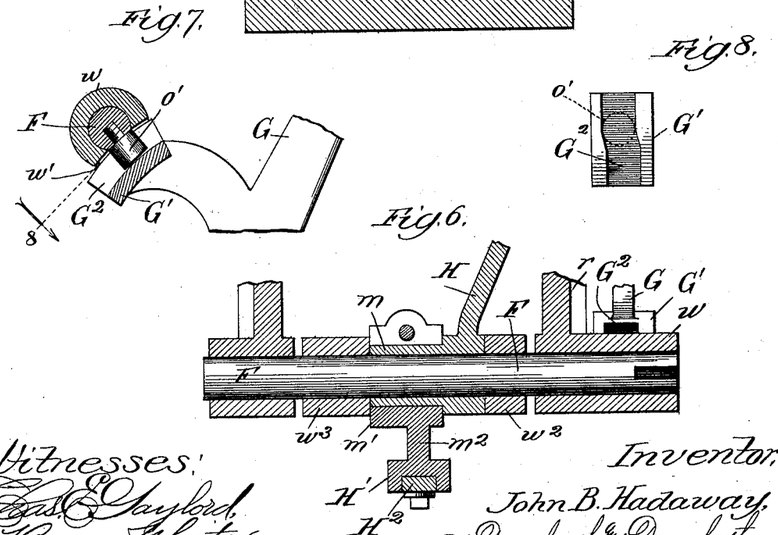
Fig. 6 is a section taken on dotted line 6 in Fig. 1, looking in the direction of the arrow, showing details of construction.
Fig. 7 is a section taken upon the dotted line 7 in Fig. 4, looking in the direction of the arrow.
Fig. 8 is a view taken on the dotted line 8 in Fig. 7, looking in the direction of the arrow.

Any suitable mechanism may be employed to impart the lateral movement to the presser-tool $H^2$, such movement being secured in the machine of the drawings by imparting a sliding movement to the shaft F in its bearings, which is accomplished by the following mechanism:

A bell-crank lever G, fulcrumed upon a stud $o$, has at the end of the forward arm a head G', in which is formed an inclined cam-groove which engages a roll mounted on a stud projecting from the shaft F through a slot in the bearing at the forward end of the arm $r$, (see Fig. 7,) and the rear arm of the lever G has a cam-roll $n$, which engages the cam-path D in the inner face of the pulley C². Sufficient space is left between the collar $w^2$ and the collar $w^3$ and the adjacent faces of the bearings which support the shaft F, so that as the lever G is rocked upon its fulcrum it will impart a short reciprocation to said shaft in its bearings, and thus cause the presser-tool H² to have a movement from side to side, and such movement, as before stated, is timed to occur with the sidewise movement of the anvil or former. After the work has been fed laterally by the presser-tool and the anvil or former and before they return to engage the work for a new feeding movement the beader or crimper is pressed down upon the reinforcing material and forms a bead or crimp therein either by pressing it over the lip of the insole or over the projecting bead-molding finger of the former or anvil and lays the free edge thereof upon the projecting feather of the insole.

The beading or crimping tool is shown at N and comprises a shank $h$, which has at its lower end a yoke $h'$, which is arranged to straddle the lip of the insole or the laterally-extending finger $k^4$ of the bead-molding head of the former or anvil and press the reinforcing material down over the same. Projecting rearwardly from the beader or crimper N is a block or extension $h^{15}$, which acts to depress or deflect the edge of the reinforcing material which is cut off, and thus guide it from the machine. The beader or crimper N is given vertical reciprocations toward and from the work, and for this purpose it is secured by means of suitable bolts to the front of the forward arm of the lever M, which is fulcrumed upon a stud $y$, and at the end of its rear arm carries a cam-roll $n^3$, which engages the cam-path D² in the face of the cam-drum X, whereby the rotation of the cam-drum will, by means of the lever M, impart an up-and-down movement to the beader or crimper N.

Figure 26:
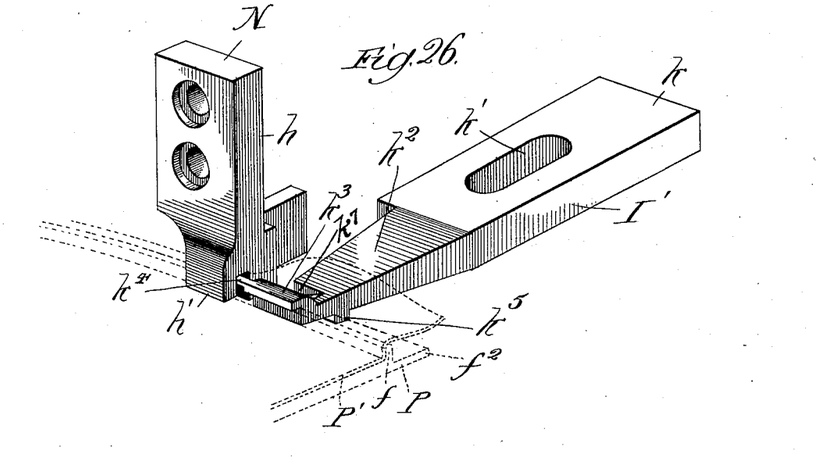
Fig. 26 is a perspective diagrammatic view showing the relative positions of the beader or crimper and the former or anvil and their operation upon the work shown in dotted lines.
Figure 27:
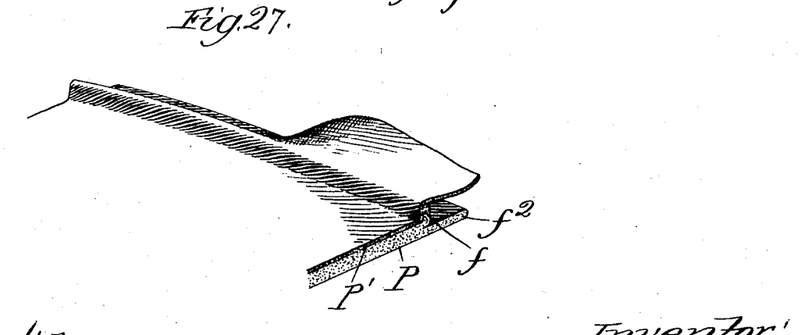
Figs. 27 and 28 show fragmentary details of insoles, showing the manner of applying the reinforcing material thereto.
Figure 28:
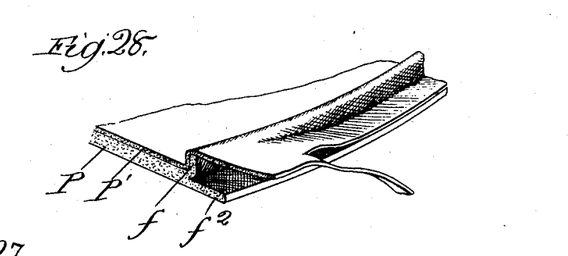

The piece of reinforcing material P' (see Figs. 26, 27, and 28) is approximately the size and shape of the insoles P, and it is necessary where said material is larger than the insole to trim off the edge to correspond to the edge of the feather $f^2$, and this is preferably accomplished by the machine at the same time that the reinforcing material is applied to the insole.

To secure the above-suggested result, the machine is provided with a suitable trimming mechanism, which in the drawings is shown as a stationary cutter L and a movable cutter O, but which may consist of any other suitable and convenient arrangement of cutters.

Figures 9, 10, 11, 12, 13, 14, 15:
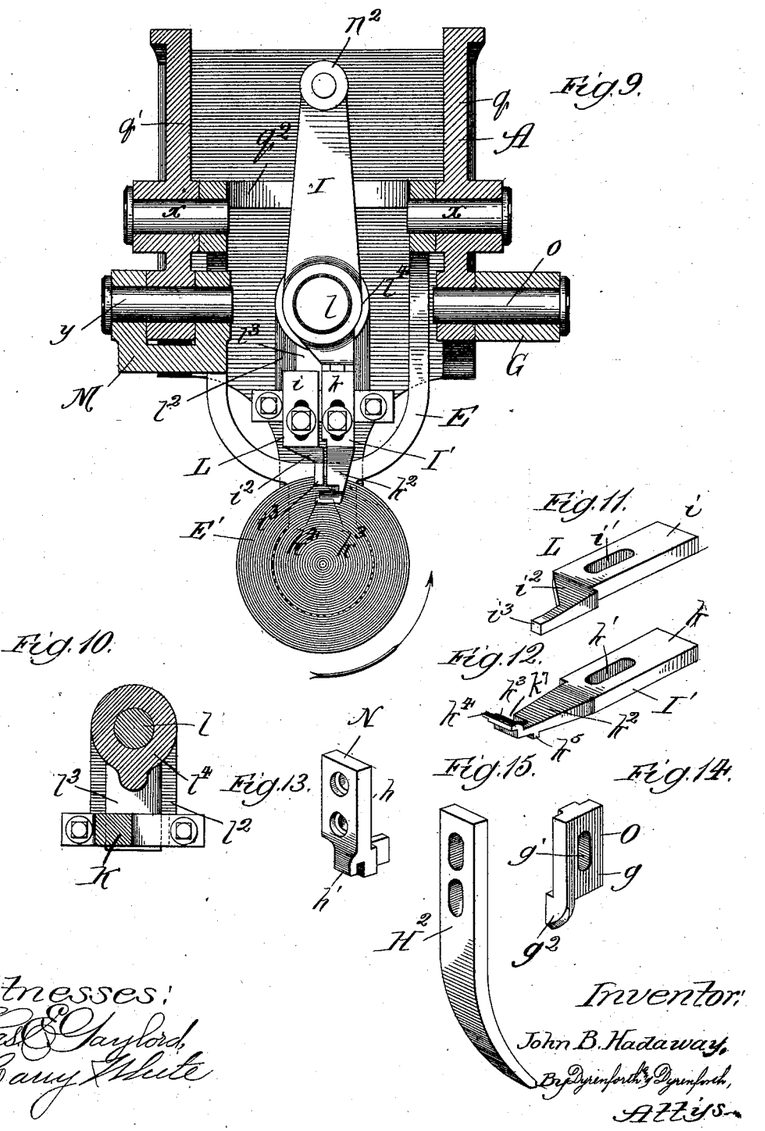
Fig. 9 is a section taken at the dotted line 9 in Fig. 3, looking in the direction of the arrow.
Fig. 10 is a section taken upon the dotted line 10 in Fig. 3, looking in the direction of the arrow.
Fig. 11 is a perspective view of the lower cutter.
Fig. 12 is a perspective view of the former or anvil.
Fig. 13 is a perspective view of the beading or crimping tool.
Fig. 14 is a perspective view of the upper cutter.
Fig. 15 is a perspective view of the presser-tool.
Figure 16:
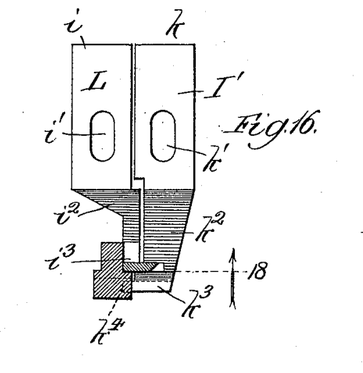
Fig. 16 is a section taken upon line 16, Fig. 17, looking in the direction of the arrow.
Figures 17, 20:
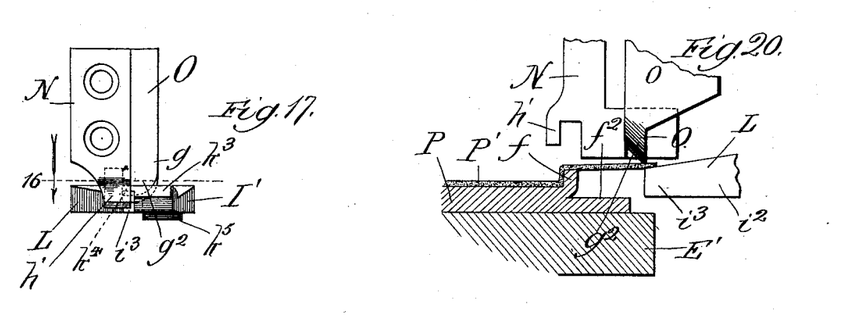
Fig. 17 is a front elevation of the cutters and the anvil or former and beader or crimper.
Fig. 20, a similar view showing the insole on the work-support with the upper and lower cutters and the beader or crimper about to act on the reinforcing material.
Figures 18, 21:
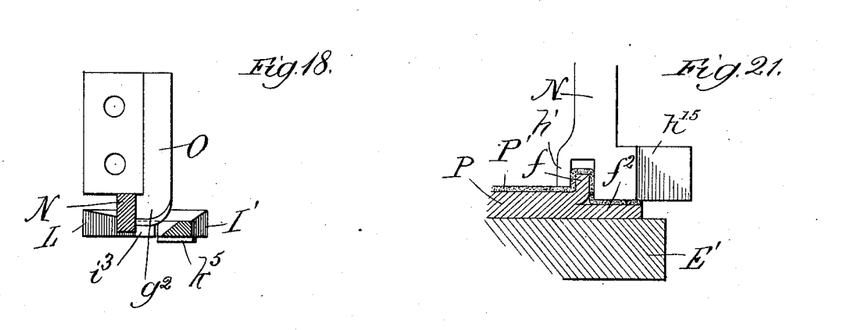
Fig. 18 is a section taken at line 18 on Fig. 16, looking in the direction of the arrow.
Fig. 21 is a similar view with the beader or crimper in the act of molding and pressing the reinforcing material upon an insole having a lip.
Figure 19:
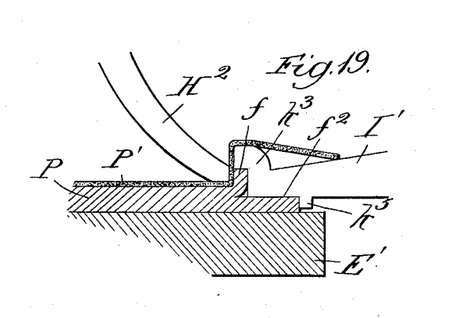
Fig. 19, a broken sectional diagram showing the insole on the work-support, with the former or anvil and gage and the presser-tool operating on the reinforcing material in applying it to the insole.

The cutter L consists of a plate having a shank $i$ and a narrow or tapered forward portion $i^2$, which terminates in a narrow end $i^3$, having a shear-face at its extreme end, as clearly shown in Fig. 11. The cutter L is slotted at $i$ to receive the securing-bolt, which fastens it in position upon the upper surface of the standard K. (See Fig. 22.)

Figure 1:
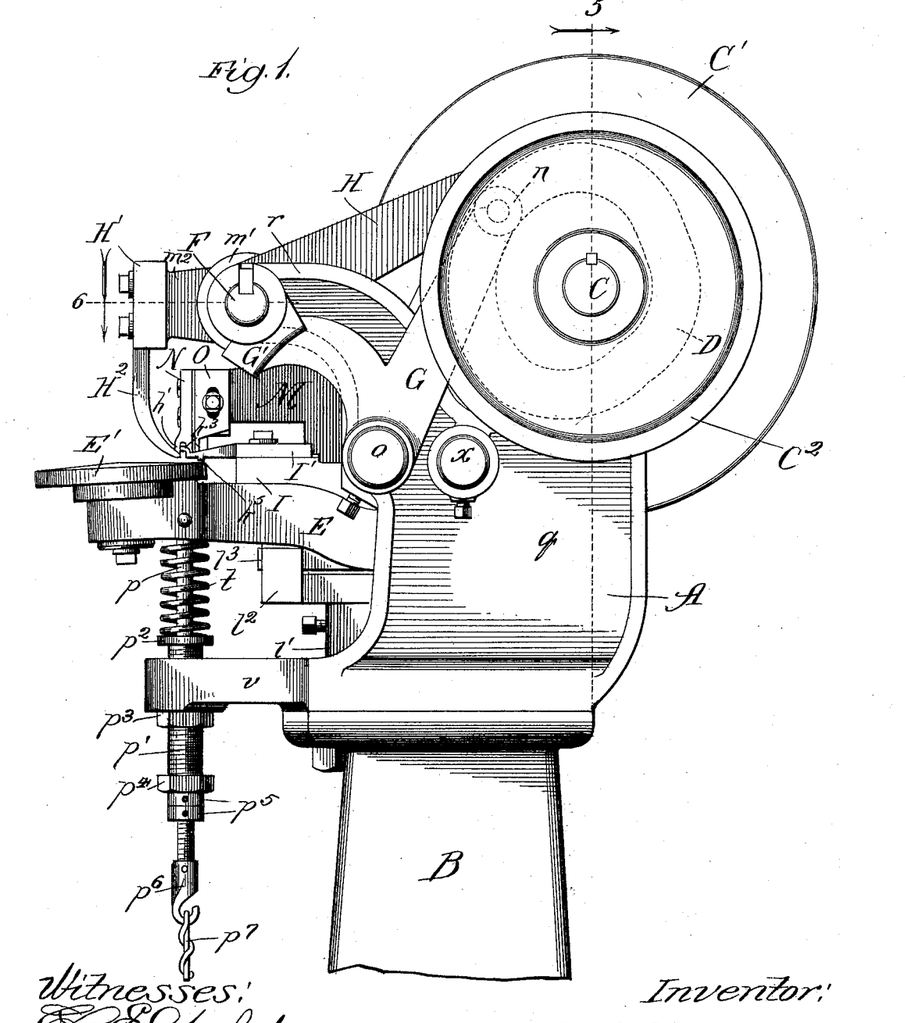
Figure 1 represents a side elevation of the upper part or head of a machine embodying the invention, looking at the right-hand side of such machine.
Figure 2:
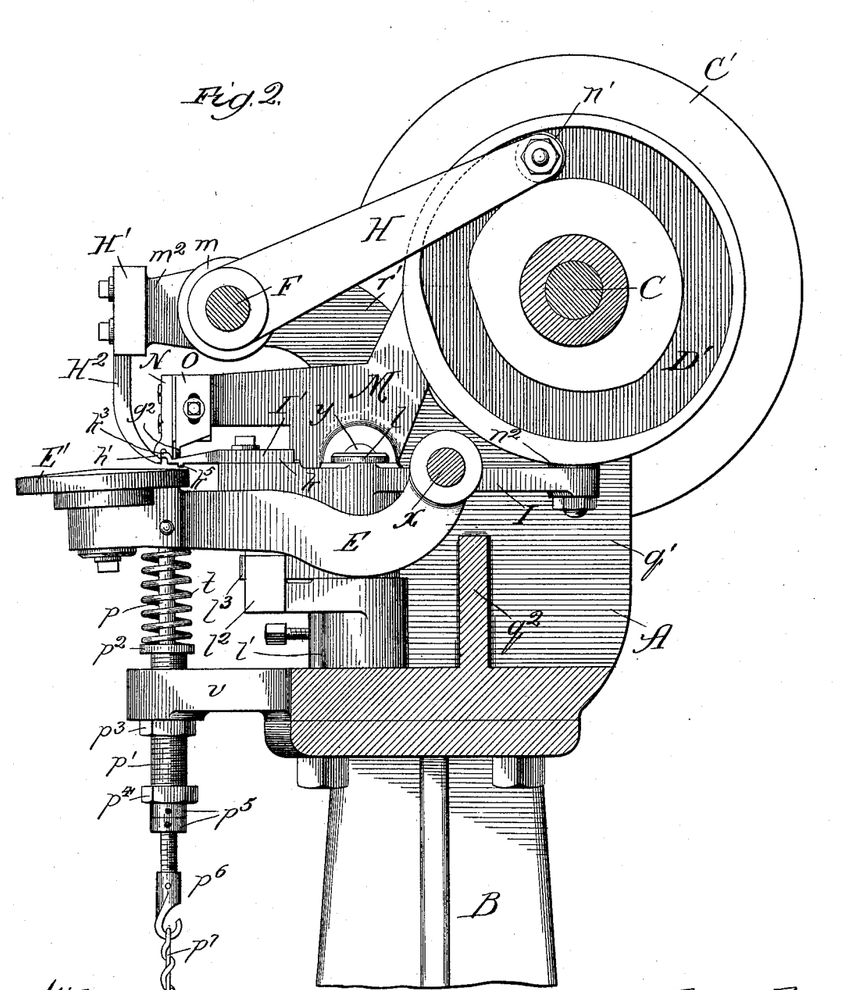
Fig. 2 is a vertical section of the machine, taken on the dotted line 2 of Fig. 4, looking in the direction of the arrow.

The cutter O is shown in Fig. 14 and consists of a plate $g$, having at its lower end a shearing-blade $g^2$, and said cutter is slotted at $g'$, whereby said cutter is secured by a bolt to the side of the front end of the lever M, adjacent to the beading and crimping tool N. (See Fig. 2.)

The cutters L and O are so positioned that they will trim off the edge of the reinforcing material close to the edge of the feather of the insole, a small section of such material being cut at each downward movement of the beading and crimping tool.

The operation of the machine in applying the reinforcing material to a lipped insole is as follows: The lipped surface of the insole is coated with a suitable cement, and the strip of canvas or other reinforcing material is temporarily secured thereto by pressing it to the cemented surface along the longitudinal medial line, the reinforcing material extending from a line on the insole corresponding to the front line of the heel of the shoe and the edge of the reinforcing material being free and lying above and over the lip. The work-support E' is now lowered against the tension of the spring $t$ by means of the foot-treadle, (not shown,) and the insole, with its reinforcing-covering, is superimposed upon the upper surface of the work-support with the feather of the insole extending beneath the forward end of the anvil or former and the edge of the reinforcing material lying above the anvil or former. The work-support is now elevated by the spring $t$, causing the edge of the feather of the insole to contact with the gage $k^5$ and the lip of the insole to be received beneath the bead-molding head of the anvil or former. The rotation of the shaft C will now, by means of the cam-path D', oscillate the lever H to cause the presser-tool H² to be depressed and engage the reinforcing material and force the same into the angle between the inner face of the lip and the upper surface of the insole, at the same time clamping the insole, by means of its lip, against the forward end of the anvil or former. After the presser-tool H² has been depressed the cam-path D³, acting upon the lever I, will impart to the anvil or former a lateral movement to the left or toward the bead-forming tool N, and simultaneously with the lateral movement of the anvil or former the shaft F will be moved laterally in the same direction by means of the lever G, causing the presser-tool H² to move with the anvil or former to feed the work toward the bead-forming tool and the trimmers. After the work has been thus fed the lever M will be rocked by means of the cam-path D², thus depressing the bead-forming tool N and causing its yoke-shaped forming end to engage the reinforcing material and press the same down over the lip of the insole adjacent to the bead-molding head of the anvil or former and, by means of the rearwardly-extending block $h^{15}$, depress and deflect the cut off edge of the reinforcing material, as before described. As the beading and crimping tool N is lowered the cutter O is depressed, whereby its edge $g^2$, acting in conjunction with the stationary cutter L, cuts or severs a small section of the edge of the reinforcing material in line with the edge of the feather of the insole. While the bead-forming tool N is in contact with the work, the presser-tool $H^2$ is raised and it and the former or anvil moved back to the starting position preparatory to again engaging the work for a new feed, and after the presser-tool is lowered to again engage the material the bead-forming tool N is raised and the operation is continued until the reinforcing material entirely around the sole has been indented over the lip and trimmed off to the contour of the insole. If it is desired that the reinforcing material be left elevated above the upper surface of the lip, then the bead-forming head $k^3$ of the anvil or former is provided with the laterally-extending finger $k^4$, which projects beneath the reinforcing-tool N and prevents the reinforcing material from being forced in close contact with the edge of the lip; but if it is desired that the reinforcing material be forced closely against the upper edge of the lip then the bead-forming head $k^3$ is formed without the projecting finger $k^4$.

Figure 24:
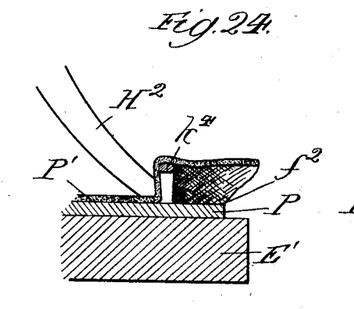
Fig. 24, a broken sectional diagram showing the insole in position on the work-support, with the presser-tool operating when applying the reinforcing-covering to an unlipped insole.
Figure 25:
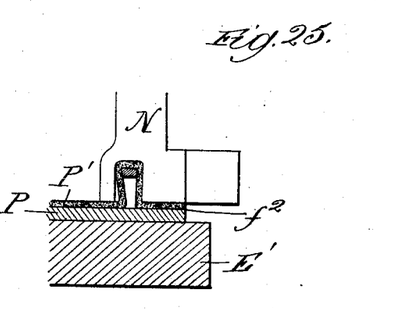
Fig. 25 is a similar view showing the operation of the beader or crimper when applying the reinforcing-covering to an unlipped insole, the bead-molding finger of the former or anvil being shown in section.

In operating on an unlipped insole the projecting finger $k^4$ of the bead-molding head $k^3$ performs an important function in that it forms a support over which the reinforcing material is bent or crimped in forming the securing-lip in the reinforcing material, as shown in Figs. 24 and 25 of the drawings.

By the term "bead" or "crimp" as employed in the preceding description and following claims I desire to be understood as referring to that portion of the reinforcing material which covers the lip of the insole and in connection with such lip receives the stitches of the inseam, or in forms of insoles which have no lip as a part of the insoles proper to the folded or doubled portion of the reinforcing material which forms a lip, which projects from the face of the insole at substantially right angles thereto and receives the stitches of the inseam, said bead or crimp being located near the edge and approximating the contour of the insole.

I have in the preceding specification referred to "bead-forming" tools and to the operation of forming a bead or crimp in the reinforcing material, and I desire to be understood as meaning by such term and by the operation of such tools either tools which form a bead or crimp in the material, as herein described, during the application to the insole of such reinforcing material or to bead-forming tools, which finally shape the reinforcing material and press it against the lip of the sole after such material has been approximately conformed to the lip of the insole by hand, and I desire to further state that I am not aware that prior to my invention it has ever been proposed to provide a machine which will automatically form a bead or crimp in the reinforcing material and apply such material to an insole, nor to provide a machine for automatically conforming such reforcing material to the lip of an insole after such material has been temporarily secured thereto and approximately conforming to the lip of the insole.

Having fully described the construction and mode of operation of my invention, I claim as new and desire to protect by Letters Patent of the United States—

1. In a machine for applying reinforcing material to insoles, the combination with a work-support, of a former or anvil to sustain the free edge portion of the reinforcing material on the insole, a beader or crimper coöperating with said former or anvil to bead or crimp the said reinforcing material, and means for actuating said beader or crimper, substantially as described.

2. In a machine for applying reinforcing material to insoles, the combination with a movable work-support, of a former or anvil to sustain the free edge portion of the reinforcing material on the insole, a beader or crimper coöperating with said former or anvil to bead or crimp the reinforcing material, and means for actuating said beader or crimper, substantially as described.

3. In a machine for applying reinforcing material to insoles, the combination with a work-support, of a reciprocating beader or crimper having a yoke-shaped head for beading or crimping the reinforcing material upon the insole, and means for actuating said beader or crimper, substantially as described.

4. In a machine for applying reinforcing material to insoles, the combination with a work-support, of a former or anvil to sustain the free edge portion of the reinforcing material on the insole, an oscillatory presser-tool coöperating with said former or anvil, a reciprocating beader or crimper coöperating with said former or anvil to bead or crimp the reinforcing material, and means for actuating the presser-tool and beader or crimper, substantially as described.

5. In a machine for applying the reinforcing material to insoles, the combination with a work-support, of a vibratory former or anvil to sustain the free edge portion of the reinforcing material on the insole and feed the work, a reciprocating beader or crimper coöperating with said former or anvil to bead or crimp the said reinforcing material, and means for actuating said beader or crimper and former or anvil, substantially as described.

6. In a machine for applying reinforcing material to insoles, the combination with a work-support, of a vibratory former or anvil to sustain the free edge portion of the reinforcing material on the insole, an oscillatory vibrating presser-tool coöperating with said former or anvil to hold and feed the work, a reciprocating beader or crimper coöperating with said former or anvil to bead or crimp the said reinforcing material, and means for actuating the presser-tool and beader or crimper, substantially as described.

7. In a machine for applying reinforcing material to insoles, the combination with a yielding work-support, of a vibratory work-gaging former or anvil to sustain the free edge portion of the reinforcing material on the insole, an oscillatory vibrating presser-tool coöperating with said former or anvil to hold and feed the work, a reciprocating beader or crimper coöperating with said former or anvil to bead or crimp the said reinforcing material, and means for actuating the presser-tool and former or anvil alternately with the beader or crimper, substantially as described.

8. In a machine for applying reinforcing material to insoles, the combination with a yielding work-support, of a vibratory former or anvil to sustain the free edge portion of the reinforcing material on the insole, a gage on said former or anvil in position to bear against the edge of the insole, an oscillatory vibrating presser-tool coöperating with said former or anvil to hold and feed the work, a reciprocating beader or crimper coöperating with said former or anvil to bead or crimp the said reinforcing material, and means for actuating the presser-tool and former or anvil alternately with the beader or crimper, substantially as described.

9. In a machine for applying reinforcing material to insoles, the combination with a yielding work-support, of a vibratory former or anvil to sustain the free edge portion of the reinforcing material on the insole, a gage for guiding the work on its support with relation to the bead formation on the work, an oscillatory vibrating presser-tool coöperating with said former or anvil to hold and feed the work, a reciprocating beader or crimper coöperating with said former or anvil to bead or crimp the said reinforcing material, and means for actuating the presser-tool and former or anvil alternately with the beader or crimper, substantially as described.

10. In a machine for applying reinforcing material to insoles, the combination with a work-support, of a reciprocating beader or crimper having a yoke-shaped head for beading or crimping the reinforcing material upon the insole, a cutter for trimming off the surplus from the edge of said material, and means for actuating said beader or crimper and cutter, substantially as described.

11. In a machine for applying reinforcing material to insoles, the combination with a work-support, of a vibratory former or anvil to sustain the free edge portion of the reinforcing material on the insole, a gage for guiding the work on its support with relation to the bead formation of the work, a lower cutter adjacent to said former or anvil, an oscillatory vibrating presser-tool, coöperating with said former or anvil to hold and feed the work, a reciprocating beader or crimper coöperating with said former or anvil to bead or crimp the said reinforcing material, an upper cutter, and means for actuating the presser-tool and former or anvil alternately with the beader or crimper and upper cutter, substantially as described.

12. In a machine for applying reinforcing material to insoles, the combination with a frame, of a work-support, a rotary drive-shaft carrying cams, a lever I fulcrumed to oscillate horizontally and engaging at one end one of said cams, a former or anvil I' supported on the opposite end of said lever to extend over said work-support, a lever H fulcrumed to oscillate vertically and engaging at one end another of said cams, a presser-tool $H^2$ supported over said work-support and connected with the lever H to oscillate therewith, a lever M fulcrumed to oscillate vertically and engaging at one end another of said cams, and a beader or crimper N on the opposite end of said lever M adjacent to said former or anvil I', substantially as described.

13. In a machine for applying reinforcing material to insoles, the combination with the frame, of a work-support, a rotary drive-shaft carrying cams, a lever I fulcrumed to oscillate horizontally and engaging at one end one of said cams, a former or anvil I' supported on the opposite end of said lever to extend over said work-support and having a head $k^3$, a lever H fulcrumed to oscillate vertically and engaging at one end another of said cams, a presser-tool $H^2$ supported over said work-support and connected with said lever H to oscillate therewith, a lever M fulcrumed to oscillate vertically and engaging at one end another of said cams, and a beader or crimper N, having a yoke-shaped head $h'$ and supported on the opposite end of said lever M adjacent to said former or anvil I', substantially as described.

14. In a machine for applying reinforcing material to insoles, the combination with the frame, of a work-support, a rotary drive-shaft carrying cams, a lever I fulcrumed to vibrate horizontally and engaging at one end one of said cams, a former or anvil I' supported on the opposite end of said lever to extend over said work-support, a cutter L adjacent to said former or anvil, a lever H fulcrumed to oscillate vertically and engaging at one end another of said cams, a presser-tool $H^2$ supported over said work-support and connected with the lever H to oscillate therewith, a lever M fulcrumed to oscillate vertically and engaging at one end another of said cams, a beader or crimper N on the opposite end of said lever M adjacent to said former or anvil I', and a cutter O on the lever M, substantially as described.

15. In a machine for applying reinforcing material to insoles, the combination with a frame A, of a work-support E' on a spring-controlled frame E, a drive-shaft C carrying a pulley $C^2$ having formed on one face a cam-groove D, and a cam-drum having formed on its outer faces, respectively, the cam-grooves D' and D² and a cam-groove D³, a longitudinally-reciprocating shaft F, a lever G fulcrumed to engage at one end the cam D, and carrying at its opposite end a cam G² in engagement with a roll $o'$ on the shaft F, a lever I fulcrumed to vibrate horizontally and engaging at one end the cam D³, a former or anvil I' supported on the opposite end of the lever I, a cutter L adjacent to said former or anvil, a lever H fulcrumed to engage at one end the cam D' and carrying at its opposite end a sleeve $m$ surrounding the shaft F, a collar $m'$ surrounding said sleeve and carrying a head H' supporting the presser-tool H², a lever M fulcrumed to engage at one end the cam D², and carrying at its opposite end the beader or crimper N, and a cutter $o$ on said lever M, the whole being constructed and arranged to operate substantially as described.

16. In a machine for applying reinforcing material to insoles, the combination with a work-support, of bead-forming tools and mechanism to actuate said tools to cause them to form a bead or crimp in said reinforcing material, substantially as described.

17. In a machine for applying reinforcing material to insoles, the combination with a work-support, of work-feeding and bead-forming tools, and actuating mechanism therefor, adapted to feed the work and form a bead or crimp in the reinforcing material, substantially as described.

18. In a machine for applying reinforcing material to insoles, the combination with bead-forming mechanism for forming the bead or crimp in the reinforcing material, of edge-trimming mechanism for trimming the edge of said reinforcing material, substantially as described.

19. In a machine for applying reinforcing material to insoles, the combination with a work-support, of bead-forming mechanism, acting to form a bead or crimp in the reinforcing material, and to secure said reinforcing material to an insole, substantially as described.

20. In a machine for applying reinforcing material to insoles, the combination with a work-support, of bead-forming mechanism, operating automatically to form a bead or crimp in the insole-reinforcing material, substantially as described.

21. In a machine for applying reinforcing material to insoles, mechanism operating automatically to form a bead or crimp in said reinforcing material, and to secure said reinforcing material to an insole, substantially as described.

22. In a machine for applying reinforcing material to insoles, the combination with a vibrating anvil or former arranged to project under the edge of the reinforcing material, of a presser-tool and means to impart a simultaneous lateral movement to the anvil or former and the presser-tool, substantially as described.

23. In a machine for applying reinforcing material to insoles, the combination with an anvil or former and a beading or crimping tool, of a presser-tool, means to move said tool toward and from the work, and means to laterally reciprocate said tool in the direction of the feed of the work, substantially as described.

24. In a machine for applying reinforcing material to insoles, the combination with a beading or crimping tool, of an anvil or former arranged to project beneath the reinforcing material, and to engage and feed the work, and means to actuate said anvil or former, substantially as described.

25. In a machine for applying reinforcing material to insoles, the combination with a beading or crimping tool, of an anvil or former having a bead-molding head and a shoulder to bear against the lip of the insole, substantially as described.

26. In a machine for applying reinforcing material to insoles, the combination with a beading or crimping tool, of an anvil or former having a bead-molding head projected therefrom, substantially as described.

27. In a machine for applying reinforcing material to insoles, the combination with a beading or crimping tool, of an anvil or former having a bead-molding head and a finger projecting laterally from said head, substantially as described.

JOHN B. HADAWAY.

In presence of—
  M. J. FROST,
  J. H. LEE.